United States Patent
Caldarone et al.

(10) Patent No.: US 11,587,132 B2
(45) Date of Patent: *Feb. 21, 2023

(54) SYSTEM AND METHOD FOR PRICING OF VIRTUAL CONTAINERS DETERMINED STOCHASTICALLY UPON ACTIVATION

(71) Applicant: Kabam, Inc., San Francisco, CA (US)

(72) Inventors: Michael C. Caldarone, Palo Alto, CA (US); Stephanie K. Schultz, San Francisco, CA (US)

(73) Assignee: Kabam, Inc., San Francisco, CA (US)

( * ) Notice: Subject to any disclaimer, the term of this patent is extended or adjusted under 35 U.S.C. 154(b) by 285 days.

This patent is subject to a terminal disclaimer.

(21) Appl. No.: 17/021,868

(22) Filed: Sep. 15, 2020

(65) Prior Publication Data
US 2020/0410558 A1 Dec. 31, 2020

Related U.S. Application Data

(63) Continuation of application No. 13/898,191, filed on May 20, 2013, now Pat. No. 10,789,627.

(51) Int. Cl.
*G06Q 30/06* (2012.01)
*G06Q 30/0283* (2023.01)
*G06Q 30/0601* (2023.01)

(52) U.S. Cl.
CPC ..... *G06Q 30/0283* (2013.01); *G06Q 30/0641* (2013.01)

(58) Field of Classification Search
CPC . G06Q 30/06; G06Q 30/0283; G06Q 30/0641
See application file for complete search history.

(56) References Cited

U.S. PATENT DOCUMENTS

| | | | |
|---|---|---|---|
| 5,933,813 | A | 8/1999 | Teicher |
| 5,964,660 | A | 10/1999 | James |
| 6,748,365 | B1 | 6/2004 | Quinlan |
| 6,850,900 | B1 | 2/2005 | Hare |
| 6,928,474 | B2 | 8/2005 | Venkatesan |

(Continued)

FOREIGN PATENT DOCUMENTS

WO 2014046561 A1 3/2014

OTHER PUBLICATIONS

"Mystery Box." The Simpsons: Tapped Out Wiki, Apr. 20, 2013, web.archive.org/web/20130420013938/simpsonstappedout.wikia.com/wiki/Mystery_Box.*

(Continued)

*Primary Examiner* — Jeffrey A. Smith
*Assistant Examiner* — Jennifer V Lee
(74) *Attorney, Agent, or Firm* — Esplin & Associates, PC

(57) ABSTRACT

An approach to facilitating pricing of virtual containers is provided. Item prices associated with obtaining item instances of virtual items in a game space may be determined. Probabilities that container instances of virtual containers will provide individual ones of the item instances of the virtual items upon activation by users in the game space may be determined. Container prices to be associated with obtaining the container instances of the virtual containers may be determined based on the determined item prices and/or the determined probabilities. A store interface may present offers to the users to purchase the container instances of the virtual containers at the determined container prices.

16 Claims, 6 Drawing Sheets

(56) References Cited

U.S. PATENT DOCUMENTS

| | | |
|---|---|---|
| 7,076,453 B2 | 7/2006 | Jammes |
| 7,533,336 B2 | 5/2009 | Jaffe |
| 7,660,740 B2 | 2/2010 | Boone |
| 7,666,095 B2 | 2/2010 | Van Luchene |
| 7,682,239 B2 | 3/2010 | Friedman |
| 8,016,668 B2 | 9/2011 | Hardy |
| 8,050,976 B2 | 11/2011 | Staib |
| 8,157,635 B2 | 4/2012 | Hardy |
| 8,187,101 B2 | 5/2012 | Herrmann |
| 8,221,223 B2 | 7/2012 | Walker |
| 8,226,472 B2 | 7/2012 | Van Luchene |
| 8,272,956 B2 | 9/2012 | Kelly |
| 8,282,491 B2 | 10/2012 | Auterio |
| 8,287,383 B1 | 10/2012 | Etter |
| 8,287,384 B2 | 10/2012 | Auterio |
| 8,292,743 B1 | 10/2012 | Etter |
| 8,332,260 B1 | 12/2012 | Mysen |
| 8,348,767 B2 | 1/2013 | Mahajan |
| 8,360,858 B2 | 1/2013 | LaRocca |
| 8,360,867 B2 | 1/2013 | VanLuchene |
| 8,366,544 B2 | 2/2013 | Walker |
| 8,401,913 B2 | 3/2013 | Alivandi |
| 8,777,754 B1 | 7/2014 | Santini |
| 8,920,243 B1 | 12/2014 | Curtis |
| 9,138,639 B1 | 9/2015 | Ernst |
| 9,345,974 B1* | 5/2016 | Santini ............... G07F 17/3244 |
| 9,737,819 B2 | 8/2017 | Desanti |
| 10,357,720 B2 | 7/2019 | Curtis |
| 10,729,983 B2 | 8/2020 | Curtis |
| 10,789,627 B1 | 9/2020 | Caldarone |
| 11,164,200 B1 | 11/2021 | Curtis |
| 2002/0059397 A1 | 5/2002 | Feola |
| 2002/0095327 A1 | 7/2002 | Zumel |
| 2003/0032476 A1 | 2/2003 | Walker |
| 2003/0102625 A1 | 6/2003 | Katz |
| 2004/0068451 A1 | 4/2004 | Lenk |
| 2004/0215524 A1 | 10/2004 | Parkyn |
| 2004/0267611 A1 | 12/2004 | Hoerenz |
| 2005/0096117 A1* | 5/2005 | Katz ........................ A63F 3/06 463/17 |
| 2005/0114223 A1 | 5/2005 | Schneider |
| 2005/0165686 A1 | 7/2005 | Zack |
| 2006/0200370 A1 | 9/2006 | Ratliff |
| 2007/0129139 A1* | 6/2007 | Nguyen ............. G07F 17/3262 463/16 |
| 2008/0032787 A1 | 2/2008 | Low |
| 2008/0154798 A1 | 6/2008 | Valz |
| 2008/0207327 A1 | 8/2008 | Van Luchene |
| 2008/0234043 A1 | 9/2008 | McCaskey |
| 2008/0275786 A1 | 11/2008 | Gluck |
| 2009/0011812 A1 | 1/2009 | Katz |
| 2009/0017886 A1 | 1/2009 | McGucken |
| 2009/0204907 A1 | 8/2009 | Finn |
| 2009/0210301 A1 | 8/2009 | Porter |
| 2009/0234710 A1 | 9/2009 | Belgaied Hassine |
| 2009/0247282 A1 | 10/2009 | Cheng |
| 2010/0035689 A1 | 2/2010 | Altshuler |
| 2010/0050088 A1 | 2/2010 | Neustaedter |
| 2010/0094841 A1 | 4/2010 | Bardwil |
| 2010/0174593 A1 | 7/2010 | Cao |
| 2010/0198653 A1 | 8/2010 | Bromenshenkel |
| 2010/0211431 A1 | 8/2010 | Lutnick |
| 2010/0228606 A1 | 9/2010 | Walker |
| 2010/0241491 A1 | 9/2010 | Eglen |
| 2010/0241492 A1 | 9/2010 | Eglen |
| 2011/0092273 A1 | 4/2011 | Cerbini |
| 2011/0113353 A1 | 5/2011 | Koh |
| 2011/0145040 A1 | 6/2011 | Zahn |
| 2011/0300923 A1 | 12/2011 | VanLuchene |
| 2012/0011002 A1 | 1/2012 | Crowe |
| 2012/0040743 A1 | 2/2012 | Auterio |
| 2012/0040761 A1 | 2/2012 | Auterio |
| 2012/0042282 A1 | 2/2012 | Wong |
| 2012/0047002 A1 | 2/2012 | Patel |
| 2012/0059730 A1 | 3/2012 | Jensen |
| 2012/0101886 A1 | 4/2012 | Subramanian |
| 2012/0109785 A1 | 5/2012 | Karlsson |
| 2012/0130856 A1 | 5/2012 | Petri |
| 2012/0142429 A1 | 6/2012 | Muller |
| 2012/0166380 A1 | 6/2012 | Sridharan |
| 2012/0178529 A1 | 7/2012 | Collard |
| 2012/0197874 A1 | 8/2012 | Zatkin |
| 2012/0203669 A1 | 8/2012 | Borsch |
| 2012/0215667 A1 | 8/2012 | Ganz |
| 2012/0221430 A1 | 8/2012 | Naghmouchi |
| 2012/0231891 A1 | 9/2012 | Watkins |
| 2012/0245988 A1 | 9/2012 | Pace |
| 2012/0289315 A1 | 11/2012 | Van Luchene |
| 2012/0289330 A1 | 11/2012 | Leydon |
| 2012/0289346 A1 | 11/2012 | VanLuchene |
| 2012/0295699 A1 | 11/2012 | Reiche |
| 2012/0296716 A1 | 11/2012 | Barbeau |
| 2012/0309504 A1 | 12/2012 | Isozaki |
| 2012/0330785 A1 | 12/2012 | Hamick |
| 2013/0005466 A1 | 1/2013 | Mahajan |
| 2013/0006736 A1 | 1/2013 | Bethke |
| 2013/0012304 A1 | 1/2013 | Cartwright |
| 2013/0013459 A1 | 1/2013 | Kerr |
| 2013/0090173 A1 | 4/2013 | Kislyi |
| 2013/0124361 A1 | 5/2013 | Bryson |
| 2013/0226733 A1 | 8/2013 | Evans |
| 2013/0281194 A1 | 10/2013 | Johnson |
| 2014/0033262 A1 | 1/2014 | Anders |
| 2014/0067526 A1 | 3/2014 | Raju |
| 2014/0067544 A1 | 3/2014 | Klish |
| 2014/0073420 A1 | 3/2014 | Matthew |
| 2014/0087882 A1 | 3/2014 | Matsumoto |
| 2014/0089048 A1 | 3/2014 | Bruich |
| 2014/0100020 A1 | 4/2014 | Carroll |
| 2014/0157314 A1 | 6/2014 | Roberts |
| 2014/0243072 A1 | 8/2014 | Santini |
| 2014/0337259 A1 | 11/2014 | Lamb |
| 2015/0019349 A1 | 1/2015 | Milley |
| 2015/0031442 A1 | 1/2015 | Colvin |
| 2019/0220897 A1 | 7/2019 | Caldarone |
| 2019/0262716 A1 | 8/2019 | Ernst |
| 2019/0344184 A1 | 11/2019 | Curtis |
| 2021/0283509 A1 | 9/2021 | Ernst |
| 2021/0291055 A1 | 9/2021 | Caldarone |

OTHER PUBLICATIONS

Author(s) Hamari, Juho, Title: game design as marketing: How game mechanics create demand for virtual goods Journal:SSRN Publication date:Aug. 21, 2009. 16 pages, [retrieved on: May 29, 2022 ]. Retrieved from the Internet: < URL: https://papers.ssrn.com/sol3/papers.cfm ?abstract_id=1443907&download=yes (Year: 2009).

Author(s) Lehdonvirta, Vili. Title: Virtual Item sales as a revenue model Journal:Electronic Commerce Research. Publication date:Mar. 11, 2009 [retrieved on: May 29, 2022 ]. 17 pages. Retrieved from the Internet: < URL: https://link.springer.com/article/10.1007/s106 009-9028-2 > (Year: 2009).

Lehdonvirta, Vili. "Virtual item sales as a revenue model: identifying attributes that drive purchase decisions". Springer Science + Business Media [online]. Mar. 10, 2009 .[retrieved on: Aug. 18, 2021 1. Retrieved from the Internet: < URL: https://link.springer.com/content/pdf10.1007/s10660-009-9028-2.pdf>p. 101.

"Behavioural Analytics & Campaigning", http://lotaris.com/behavioural._analytics_and._Campaigning.htm, screenshot access date May 24, 2012 2:21 PM, 1 page.

"Building Structures". War2.warcraft.org. Online. Accessed via the Internet. Accessed Aug. 9, 2014. <URL: http://war2.warcraft.org/strategy/verybasics/building.shtml>, 3 pages.

"Clash of Clans". Wikipedia.org. Online. Accessed via the Internet. Accessed Aug. 9, 2014. <URL: http://en.wikipedia.org/wiki/Clash of Clans>, 3 pages.

"Digital River World Payments and Lotaris Partner to Extend Mobile Application Licensing and Monetization Capabilities to Software Publishers", Business Wire Press Release, http://www.

(56) References Cited

OTHER PUBLICATIONS marketwatch.com/story/digital-river-world-payments-and-lotaris . . . , posted San Francisco, Mar. 27, 2012 (Business Wire), 8:30 a.m. EDT, printed May 24, 2012 2:32 PM, 3 pages.

"Digital River World Payments and Lotaris Partner to Extend Mobile Application Licensing and Monetization Capabilities to Software Publishers", LOTARIS Press Release, http://www.lotaris.com/digital_river_world_payments_and_lotaris_partne . . . , posted Tuesday, Mar. 27, 2012, screenshop access date May 24, 2012, 2:19 PM, 1 page.

"Gem calculation formulas", forum.supercell.net. Online. Accessed via the Internet. Accessed Aug. 9, 2014. <URL: http://forum.supercell.net/showthread.php/23028-Gem-calculation-formulas>, 3 pages.

"How Town Hall to Level 4". Forum.supercell.net. Online. Jan. 31, 2013. Accessed via the Internet. Accessed Feb. 21, 2015. URL:http://forum.supercell.net/showthread.php/15052-How-Town-Hall-to-Level-4, 2 pages.

"I don't have enough resources/builders to upgrade anything in my village, what can I do?" gamesupport.supercell.net. Online. Accessed via the Internet. Accessed Aug. 9, 2014. <URL: https://gamesupport.supercell.net/hc/en-us/articles/421482-I-don-t-have-enough-resources-builders-to-upgrade-anything-in-my-village-what-can-I-do->, Apr. 23, 2014, 9 pages.

"Lotro-Wiki.com" (evidence in regards to "Lord of the Rings Online" MMORPG game), latest Dec. 22, 2011, <http://lotrowiki.com/index.php/Main_Page), http://lotro-wiki.com/index.php?title=LOTRO_Store&oldid=396550, http://lotro-wiki.com/index.php?title=Quest:A_Little_Extra_Never_Hurts_—_Part_1&oldid=399597, Links are to used articles, 28 pages.

"Lotro-Wiki.com" (evidence in regards to "Lord of the Rings Online" MMORPG game), latest Dec. 22, 2011, http://lotro-wiki.com/index.php/Main_Page) (http://lotro-wiki.com/index.php?title=LOTRO_Store&oldid=396550, http://lotro-wiki.com/index.php?title=Quest:A_Little_Extra_Never_Hurts_—_Part_1&oldid=399597, http://lotro-wiki.com/index.php?title=Quest:A_Little_Extra_Never_Hurts_—_Part_2&oldid=399366, http://lotro-wiki.com/index.php?title=Getting_Started&oldid=349681, Links are to used articles, 33 pages.

"Mystery Box." The Simpsons: Tapped Out Wiki, Apr. 20, 2013, web.archive.org/web/20130420013938/simpsonstappedout.wikia.com/wiki/Mystery_Box. (1 page).

"Warcraft II: Tides of Darkness". Wikipedia.org. Online. Accessed via the Internet. Accessed Aug. 9, 2014. <URL: http://en.wikipedia.org/wiki/Warcraft_II:_Tides_of_Darkness>, 10 pages.

<http://lotro-wiki.com/index.php?title=Ouest:A_Little_Extra_Never_Hurts_—_Part_2&oldid=399366>, <http://lotrowiki.com/index.php ?title=Getting Started&oldid=349681 >. Links are to used articles. (7 pgs) Feb. 26, 2014.

Aeria Games GmbH, "First Time Buyer—August", Aug. 10, 2010, <http://grandfantasia.aeriagames.com/news/5600/first-time-buyeraugust> (2 pgs).

City Coins. CityVille Wikia. Online. Accessed via the Internet. Accessed Aug. 9, 2014. <URL: http://cityville.wikia.com/wiki/City_Coins>, 2 pages.

FriskyMongoose "Happy Island Updates", available Jun. 12, 2012 from https://web.archive.org/web/20120612004417/http://friskymongoose.com/happy-island-updates-new-attractions-decorations-and-limited-edition-item-bundles/, 7 pages.

Gaia "Black Friday Bundle" available on Nov. 23, 2011, from http://www.gaiaonline.com/forum/community-announcements/black-friday-big-bundles-rare-items/t.76127933/, 5 pages.

Hamari, Juho, "Game Design as Marketing: How Game Mechanics Create Demand for Virtual Goods", available on vol. 5, Issue 1, 2010, retrieved from Int. Journal of Business Science and Applied Management—http://www.business-and-management.org/library/2010/5_1-14-29-Hamari,Lehdonvirta.pdf, on May 26, 2015, 16 pages.

Lotro-Wiki.com, "Hunting Lodge (Archet)" with "Introduction Quest", Aug. 14, 2012, https://lotrou wiki.com/index.php?title=Hunting_Lodge_(Archet)&oldid=495361 and <https://lotrowiki.com/index.php?title= Introduction_ Quests&oldid=358308> (6 pages).

MMO Site "Rose Online Launches the Newest in Game Feature"; available Aug. 11, 2011 from https://web.archive.org/web/20110811231226/http://news.mmosite.com/content/2011-06-21/rose_online_launches_the_newest_in_game_feature.1.shtml, 3 pages.

Ozeagle, "What happens if . . . answers about account types" on Lotro forum, Jan. 18, 2011 ,<https://www.lotro.com/forums/showthread.php?377885-What-happens-if-answers-about-the-account-types> (16 pgs).

TFWiki "teamfortress wiki" available Nov. 5, 2011 retrieved from https://web.archive.org/web/20111105044256/http://wiki.teamfortress.com/wiki/Loadout, 4 pages.

UBC, "Theory of Auctions" available on Mar. 24, 2012 from https://web.archive.org/web/20120324204610/http:/montoya.econ.ubc.ca/Econ522/auctions.pdf, slide 5, Para. 1.3, 19 pages.

Wiki "Gaia online", available on Sep. 9, 2011, https://web.archive.org/web/20110927210155/http://en.wikipedia.org/wiki/Gaia_Online, 8 pages.

Hamari, Juho, "game design as marketing: How game mechanics create demand for virtual goods"( https://papers.ssrn.com/sol3/ papers.cfm?abstract_id=1443907&download=yes)(Aug. 21, 2009) p. 5-7 as HAMARI (Year: 2009).

Author(S): Ang, Chee Title A model of cognitive loads in massively multiplayer online role. Journal:Elsevier [online], Publication date: Sep. 2006. [retrieved on: Oct. 11, 2022] Retrieved from the Internet: < URL:https://tinyuri.com/3k8wpsbh> (Year: 2006).

\* cited by examiner

SYSTEM AND METHOD FOR PRICING OF VIRTUAL CONTAINERS DETERMINED STOCHASTICALLY UPON ACTIVATION

FIELD OF THE DISCLOSURE

This disclosure relates generally to pricing of virtual containers.

BACKGROUND

Traditional sales promotions such as discounting of prices may be utilized for virtual items to boost short-term profits associated with the virtual items. However, while traditional sales promotions may have the effect of boosting short-term profits, such promotions may have lingering long-term effects relating to profitability from the virtual items or perceived values of the virtual items by users. For example, discounting virtual item prices generally provides a temporary spike in sales, and then causes a longer period of decreased sales once the regular virtual item prices are restored. Thus, among other issues, the negative effects of direct discounting of virtual item prices may outweigh short-term gains.

SUMMARY

One aspect of the disclosure relates to a system configured to facilitate pricing of virtual containers, in accordance with one or more implementations. In exemplary implementations, discounting of virtual items may be reflected using virtual containers. For example, a given virtual container may be configured such that a container instance of the given virtual container may provide users a chance to obtain one or more item instances of certain virtual items upon activation of the container instance. Container instances of the given virtual container may be provided to users for purchase at a price that is less than a price for obtaining an item instance of the most valuable or desirable virtual item of the certain virtual items independently of the container instances of the given virtual container. In this way, among other benefits, the given virtual container may represent the opportunity to obtain an item instance of the most valuable or desirable virtual item of the certain virtual items at a reduced price without necessarily having to change the price of independently purchasing an item instance of the most valuable or desirable virtual item.

In some implementations, the system may include one or more servers. The server(s) may be configured to communicate with one or more client computing platforms according to a client/server architecture. The users may access the system and/or a virtual space (e.g., a virtual world, a game space, etc.) via the client computing platforms.

The server(s) may be configured to execute one or more computer program modules to facilitate pricing of virtual containers. The computer program modules may include one or more of a game module, a price module, an item manager module, a store module, a template module, and/or other modules. In some implementations, the client computing platforms may be configured to execute one or more computer program modules that are the same as or similar to the computer program modules of the server(s) to facilitate pricing of virtual containers.

The game module may be configured to execute a game instance of a game space. The game module may be configured to facilitate presentation of views of the game space to users. The game space may be configured to facilitate interaction of the users with the game space and/or each other by performing operations in the game space in response to commands received from the users.

The price module may be configured to determine item prices associated with obtaining item instances of virtual items in the game space. The virtual items may include a first virtual item, a second virtual item, or other virtual items. The item prices may include a first item price associated with obtaining an item instance of the first virtual item, a second item price associated with obtaining an item instance of the second virtual item, or other item prices associated with obtaining item instances of the other virtual items.

In certain implementations, the price module may be configured to determine the item prices based on prices that the users paid to obtain the item instances of the virtual items. For example, the first item price may be determined based on a price that one or more of the users paid to obtain an item instance of the first virtual item. The second item price may be determined based on a price that one or more of the users paid to obtain an item instance of the second virtual item.

In some implementations, the price module may be configured to determine frequency information relating to frequencies of individual ones of the prices that the users paid to obtain the item instances of the virtual items. The price module may be configured to determine the item prices based on the frequency information. For example, the price module may be configured to determine the item prices based on the frequency information such that the first item price is determined based on frequencies of individual ones of the prices that one or more of users paid to obtain an item instance of the first virtual item and the second item price is determined based on frequencies of individual ones of the prices that one or more of users paid to obtain an item instance of the second virtual item.

The item manager module may be configured to manage virtual containers. The managed virtual containers may include a first virtual container or other virtual containers. In certain implementations, the item manager module may be configured such that a container instance of the first virtual container may be activated once by a user to obtain one or more item instances of a first virtual item, a second virtual item, or other virtual items. In some implementations, the item manager module may be configured such that a container instance of the first virtual container may be activated a plurality of times by a user to obtain a plurality of item instances of the first virtual item, the second virtual item, or the other virtual items.

The item manager module may be configured to determine probabilities that the container instances of the virtual containers will provide individual ones of item instances of the virtual items upon activation by the users in the game space. As discussed, the virtual containers may include a first virtual container or other virtual containers. The virtual items may include a first virtual item, a second virtual item, or other virtual items. The probabilities may include a first probability that a container instance of the first virtual container will provide an item instance of the first virtual item upon activation, a second probability that a container instance of the first virtual container will provide an item instance of the second virtual item upon activation, or other probabilities.

The price module may be configured to determine container prices to be associated with obtaining the container instances of the virtual containers. In certain implementations, the price module may be configured to determine the container prices to be associated with obtaining the container instances of the virtual containers based on the determined item prices or the determined probabilities (e.g., determined prices, determined probabilities, or determined item prices and determined probabilities). By way of example, the price module may be configured to determine a first container price for obtaining a container instance of the first virtual container based on the first item price (relating to the first virtual item), the first probability (relating to the first virtual item), the second item price (relating to the second virtual item), or the second probability (relating to the second virtual item).

The store module may be configured to present a store interface to the users of the game space. The store interface may present offers to users to purchase the container instances of the virtual containers at the determined container prices. For example, the store interface may present a container instance of the first virtual container for purchase at the first container price.

The template module may be configured to manage container templates. The managed container templates may include a first container template or other container templates. In certain implementations, the item manager module may be configured to generate one or more container instances of the first virtual container based on the first container template. In some implementations, individual ones of the container templates indicate: (i) an amount of virtual items in a virtual item set from which an item instance of a virtual item is provided to a user upon activation of a container instance of a virtual container; (ii) an item type of virtual items of the virtual item set; (iii) a probability that an item instance of a virtual item of the virtual item set will be provided to a user upon activation of a container instance the virtual container; or (iv) a value to be provided that is associated with at least one virtual item of the virtual item set responsive to a determination that an item instance of the at least one virtual item will be provided to a user that activated a container instance of the virtual container.

The template module may be configured such that the container templates are associated with template probabilities that individual ones of the container templates will be selected responsive to a stochastic selection of at least one of the container templates. The template probabilities may include a first template probability that the first container template will be selected responsive to a stochastic selection of at least one of the container templates. The item manager module may be configured to generate one or more container instances of the first virtual container based on the first container template responsive to the first container being stochastically selected.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
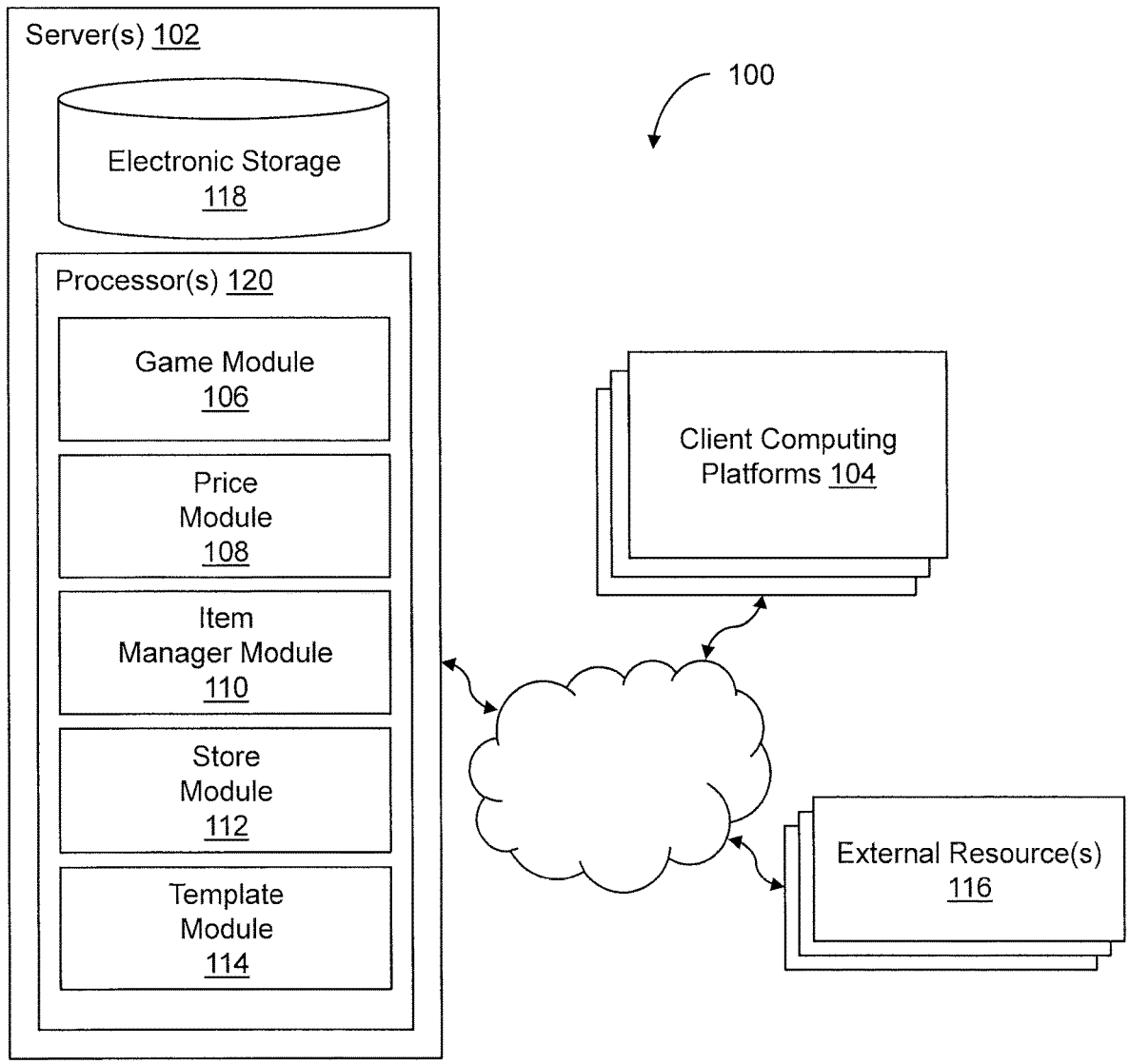
FIG. 1 illustrates a system configured to facilitate pricing of virtual containers, in accordance with one or more implementations.

FIG. 1 illustrates a system 100 configured to facilitate pricing of virtual containers, in accordance with one or more implementations. In exemplary implementations, discounting of virtual items may be reflected using virtual containers. For example, a given virtual container may be configured such that a container instance of the given virtual container may provide users a chance to obtain one or more item instances of certain virtual items upon activation of the container instance. Container instances of the given virtual container may be provided to users for purchase at a price that is less than a price for obtaining an item instance of the most valuable or desirable virtual item of the certain virtual items independently of the container instances of the given virtual container. In this way, the given virtual container may represent the opportunity to obtain an item instance of the most valuable or desirable virtual item of the certain virtual items at a reduced price without necessarily having to change the price of independently purchasing an item instance of the most valuable or desirable virtual item. In addition, among other benefits, discounting of virtual items using virtual containers may provide the benefits associated with direct discounting of virtual items (e.g., higher sales during the time that container instances of the virtual containers are available for purchase), while mitigating the negative effects associated with direct discounting of virtual items (e.g., reduced duration and intensity of decreased sales of individual virtual items obtainable via the container instances that may follow the sale of the container instances).

In some implementations, system 100 may include one or more servers 102. Server(s) 102 may be configured to communicate with one or more client computing platforms 104 according to a client/server architecture. The users may access system 100 and/or a virtual space (e.g., a virtual world, a game space, etc.) via client computing platforms 104.

Server(s) 102 may be configured to execute one or more computer program modules to facilitate pricing of virtual containers. The computer program modules may include one or more of a game module 106, a price module 108, an item manager module 110, a store module 112, a template module 114, and/or other modules. In some implementations, client computing platforms 104 may be configured to execute one or more computer program modules that are the same as or similar to the computer program modules of server(s) 102 to facilitate pricing of virtual containers.

Game module 106 may be configured to execute a game instance of a game space. In some implementations, the game space may be a virtual space. As such, a game instance of the game space may be an instance of the virtual space. A space module (not shown for illustrative convenience) may be configured to implement the instance of the virtual space executed by the computer modules to determine state of the virtual space. The state may then be communicated (e.g., via streaming visual data, via object/position data, and/or other state information) from server(s) 102 to client computing platforms 104 for presentation to users. The state determined and transmitted to a given client computing platform 104 may correspond to a view for a user character being controlled by a user via the given client computing platform 104. The state determined and transmitted to a given client computing platform 104 may correspond to a location in the virtual space. The view described by the state for the given client computing platform may correspond, for example, to the location from which the view is taken, the location the view depicts, and/or other locations, a zoom ratio, a dimensionality of objects, a point-of-view, and/or view parameters of the view. One or more of the view parameters may be selectable by the user.

The instance of the virtual space may comprise a simulated space that is accessible by users via clients (e.g., client computing platforms 104) that present the views of the virtual space to a user. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer modules may be synchronous, asynchronous, and/or semi-synchronous.

The above description of the manner in which state of the virtual space is determined by the space module is not intended to be limiting. The space module may be configured to express the virtual space in a more limited, or more rich, manner. For example, views determined for the virtual space representing the state of the instance of the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the virtual space are contemplated.

Within the instance(s) of the virtual space executed by the space module, users may control characters, objects, simulated physical phenomena (e.g., wind, rain, earthquakes, and/or other phenomena), and/or other elements within the virtual space to interact with the virtual space and/or each other. The user characters may include avatars. As used herein, the term "user character" may refer to an object (or group of objects) present in the virtual space that represents an individual user. The user character may be controlled by the user with which it is associated. The user controlled element(s) may move through and interact with the virtual space (e.g., non-user characters in the virtual space, other objects in the virtual space). The user controlled elements controlled by and/or associated with a given user may be created and/or customized by the given user. The user may have an "inventory" of virtual goods and/or currency that the user can use (e.g., by manipulation of a user character or other user controlled element, and/or other items) within the virtual space. In some implementations, the "inventory" of virtual goods may include virtual containers. As an example, virtual containers may include boxes, chests, bundles, packages, or other items that at least "appear" to store or contain one or more virtual items. Activation of a container instance of a virtual container may include "opening," "unwrapping," "turning on," or other action perform with respect to the container instance by a user to obtain or for a chance to obtain one or more virtual items.

The users may participate in the instance of the virtual space by controlling one or more of the available user controlled elements in the virtual space. Control may be exercised through control inputs and/or commands input by the users through client computing platforms 104. The users may interact with each other through communications exchanged within the virtual space. Such communications may include one or more of textual chat, instant messages, private messages, voice communications, and/or other communications. Communications may be received and entered by the users via their respective client computing platforms 104. Communications may be routed to and from the appropriate users through server(s) 102 (e.g., through the space module).

Price module 108 may be configured to determine item prices associated with obtaining item instances of virtual items in the game space. The virtual items may include a first virtual item, a second virtual item, or other virtual items. The item prices may include a first item price associated with obtaining an item instance of the first virtual item, a second item price associated with obtaining an item instance of the second virtual item, or other item prices associated with obtaining item instances of the other virtual items.

In certain implementations, price module 108 may be configured to determine the item prices based on prices that the users paid to obtain the item instances of the virtual items. For example, the first item price may be determined based on a price that one or more of the users paid to obtain an item instance of the first virtual item. The second item price may be determined based on a price that one or more of the users paid to obtain an item instance of the second virtual item.

In one scenario, for example, a price that a user paid to obtain an item instance of a Virtual Item 1 may be a retail or standard price associated with Virtual Item 1. Another price that another user paid to obtain an item instance of Virtual Item 1 may be a discounted price for an item instance of Virtual Item 1 that is offered during a promotion. A calculation price associated with obtaining an item instance of Virtual Item 1 may be determined by price module 108 to be the retail/standard price associated with Virtual Item 1, the discount price offered during the promotion, or a price calculated based on the retail/standard price and the discount price.

In some implementations, price module 108 may be configured to determine frequency information relating to frequencies of individual ones of the prices that the users paid to obtain the item instances of the virtual items. Price module 108 may be configured to determine the item prices based on the frequency information. For example, price module 108 may be configured to determine the item prices based on the frequency information such that the first item price is determined based on frequencies of individual ones of the prices that one or more of users paid to obtain an item instance of the first virtual item and the second item price is determined based on frequencies of individual ones of the prices that one or more of users paid to obtain an item instance of the second virtual item.

By way of example, price module 108 may track how much users are paying for item instances of virtual items and stored the tracked information in a database (e.g., in electronic storage 118 or other storage). In one use case, price module 108 may utilize the tracked information to determine the price at which users most frequently purchase an item instance of a given virtual item during a certain time period (e.g., last two weeks, last month, overall, etc.). The most frequent price point for the given virtual item may be utilized as a determined price associated with obtaining an item instance of the given virtual item to calculate a container price for a container instance of a virtual container. If, for example, item instances of a Virtual Item 1 are determined to be most frequently purchased at 50 gems per item instance, and item instances of a Virtual Item 2 are determined to be most frequently purchased at 60 Gems per item instance, the two price points (e.g., 50 Gems and 60 Gems) for Virtual Items 1 and 2 may be used to calculate a price for a container instance of a virtual container from which a user has a chance to obtain one or more item instances of Virtual Item 1 or Virtual Item 2 upon activation of the container instance by the user.

In another use case, price module 108 may utilize the tracked information to determine frequencies of prices at which users purchase an item instance of a given virtual item during a certain time period (e.g., last two weeks, last month, overall, etc.). The prices at which users purchase an item instance of the given virtual item may be utilized along with weights that are based on the determined frequencies to determine a price for an item instance of the given virtual item to be used to calculate a container price for a container instance of a virtual container.

Item manager module 110 may be configured to manage virtual containers. The managed virtual containers may include a first virtual container or other virtual containers. In certain implementations, item manager module 110 may be configured such that a container instance of the first virtual container may be activated once by a user to obtain one or more item instances of a first virtual item, a second virtual item, or other virtual items. In some implementations, item manager module 110 may be configured such that a container instance of the first virtual container may be activated a plurality of times by a user to obtain a plurality of item instances of the first virtual item, the second virtual item, or the other virtual items.

Figure 2A:
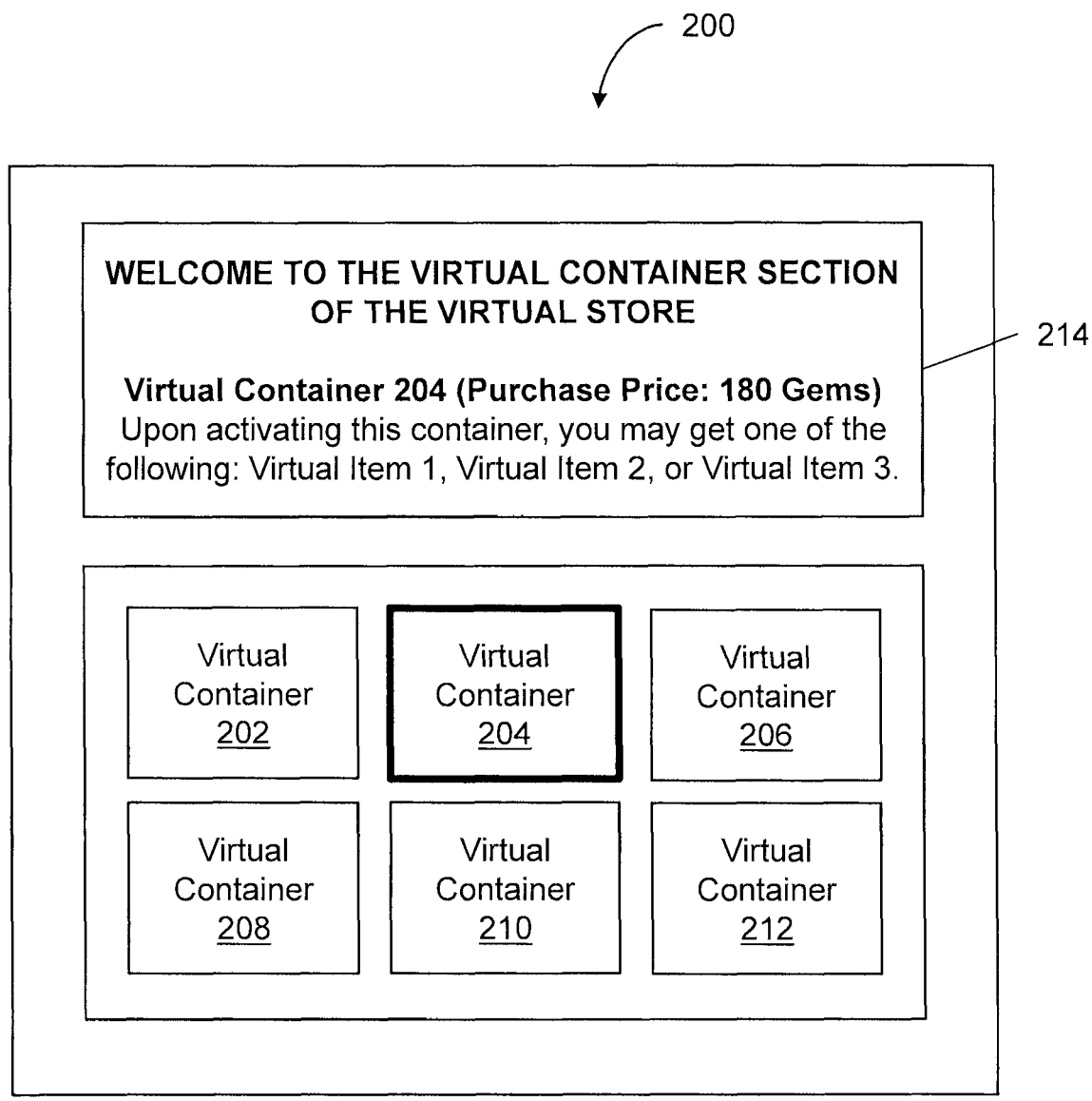
FIGS. 2A-2C illustrate a store interface that presents container instances of virtual containers for purchase, in accordance with one or more implementations.
Figure 2B:
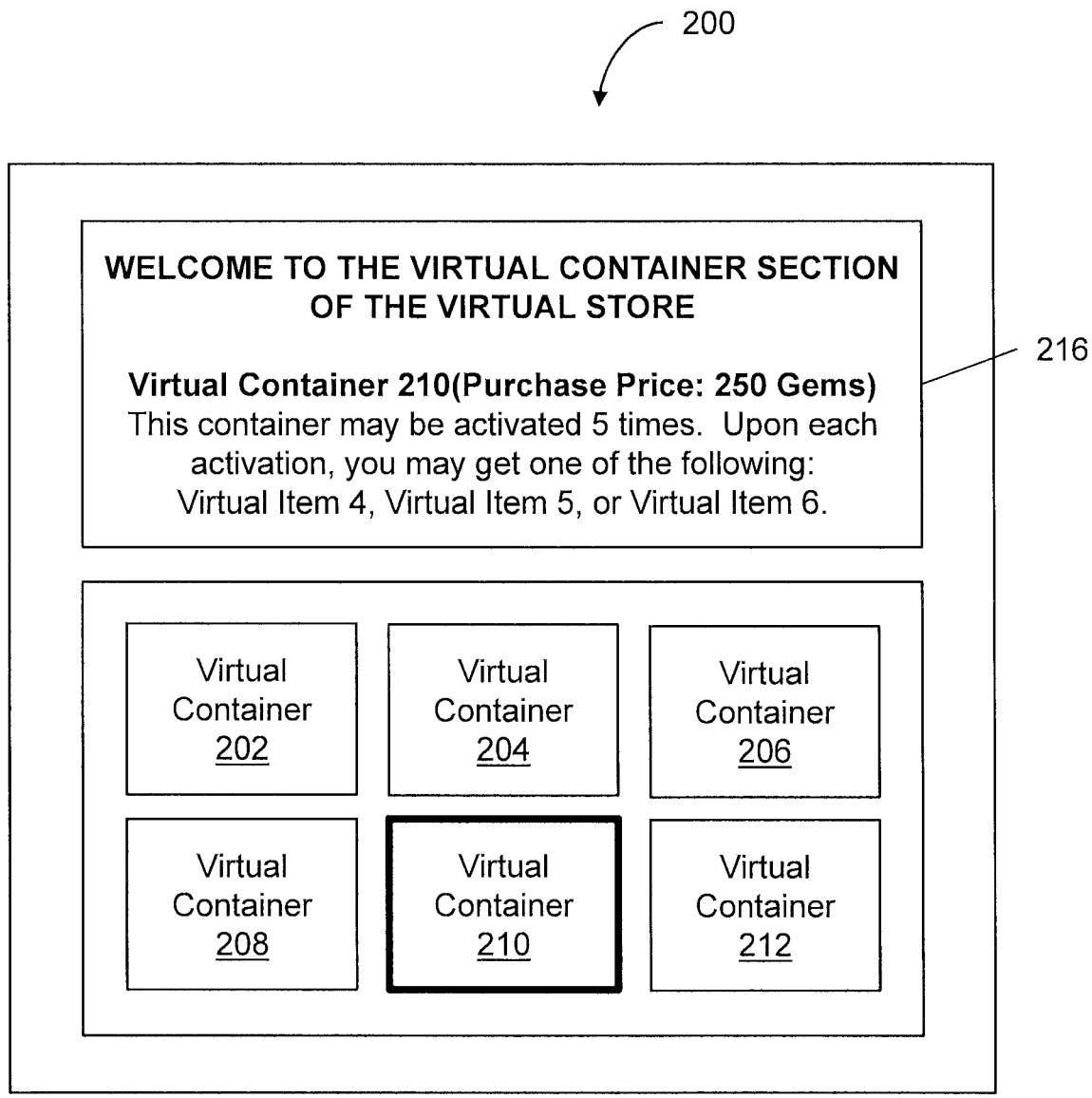
Figure 2C:
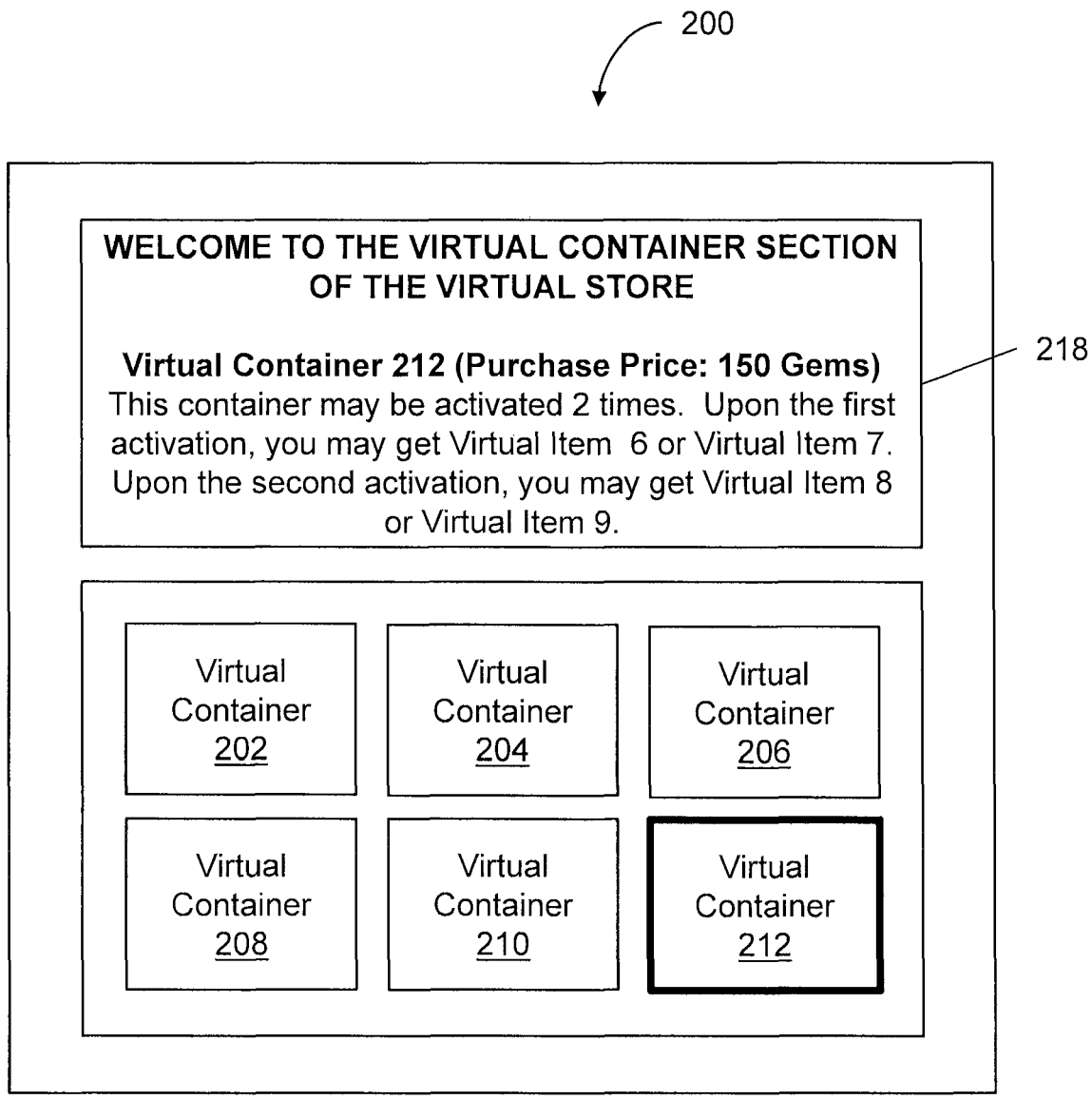

For example, FIGS. 2A-2C illustrate a store interface 200 that presents container instances of virtual containers (e.g., virtual containers 202, 204, 206, 208, 210, and 212) for purchase, in accordance with one or more implementations. In one scenario, as described by notification 214 in FIG. 2A, a container instance of virtual container 204 may be activated by a user to obtain an item instance of Virtual Item 1, Virtual Item 2, or Virtual Item 3. In another scenario, as described by notification 216 in FIG. 2B, a container instance of virtual container 210 may be activated by a user up to 5 times. The user may, for example, obtain an item instance of Virtual Item 4, Virtual Item 5, or Virtual Item 6 upon each activation. In yet another scenario, as described by notification 218 in FIG. 2C, a container instance of virtual container 212 may be activated by a user up to 2 times. The user may, for example, obtain an item instance of Virtual Item 6 or Virtual Item 7 upon a first activation and an item instance of Virtual Item 8 or Virtual Item 9 upon a second activation.

Item manager module 110 may be configured to determine probabilities that the container instances of the virtual containers will provide individual ones of item instances of the virtual items upon activation by the users in the game space. As discussed, the virtual containers may include a first virtual container or other virtual containers. The virtual items may include a first virtual item, a second virtual item, or other virtual items. The probabilities may include a first probability that a container instance of the first virtual container will provide an item instance of the first virtual item upon activation, a second probability that a container instance of the first virtual container will provide an item instance of the second virtual item upon activation, or other probabilities.

In one use case, for example, an administrator may manually enter into an administrative user interface: a name of a given virtual container; virtual items that may be obtainable via a container instance of the given virtual container; probabilities that individual ones of item instances of the virtual items will be provided upon activation of a container instance of the given virtual container; or other information. The administrator may choose to submit the inputs to: generate container instances of the given virtual container for immediate sale/distribution; generate container instances of the virtual given container for sale/distribution at a future date/time; save the inputs as part of a container template for use at a later time; or perform other actions based on the inputs. Item manager module 110 may automatically identify the probabilities from the inputs, the container template, etc., for example, when pricing of container instances of the given virtual container is initiated.

Price module 108 may be configured to determine container prices to be associated with obtaining the container instances of the virtual containers. In certain implementations, price module 108 may be configured to determine the container prices to be associated with obtaining the container instances of the virtual containers based on the determined item prices or the determined probabilities (e.g., determined prices, determined probabilities, or determined item prices and determined probabilities).

By way of example, price module 108 may be configured to determine a first container price for obtaining a container instance of the first virtual container based on the first item price (relating to the first virtual item), the first probability (relating to the first virtual item), the second item price (relating to the second virtual item), or the second probability (relating to the second virtual item). For example: (i) the first container price may be determined based on the first item price and the first probability; (ii) the first container price may be determined based on the second item price and the second probability; or (iii) the first container price may be determined based on the first item price, the first probability, the second item price, and the second probability.

Store module 112 may be configured to present a store interface to the users of the game space. The store interface may present offers to users to purchase the container instances of the virtual containers at the determined container prices. For example, the store interface may present a container instance of the first virtual container for purchase at the first container price.

In one scenario, with respect to FIG. 2A, a container instance of virtual container 204 may be associated by price module 108 with a price of 180 Gems. The price of 180 Gems to purchase a container instance of virtual container 204 may be based on: (i) a calculated price determined for an item instance of Virtual Item 1; (ii) a probability that a container instance of virtual container 204 will provide an item instance of Virtual Item 1 upon activation by a user; (iii) a calculated price determined for an item instance of Virtual Item 2; (iv) a probability that a container instance of virtual container 204 will provide an item instance of Virtual Item 2 upon activation by a user; (v) a calculated price determined for an item instance of Virtual Item 3; and (vi) a probability that a container instance of virtual container 204 will provide an item instance of Virtual Item 3 upon activation by a user.

If, for example, the calculated prices are respectively 190 Gems, 170 Gems, and 180 Gems for item instances of Virtual Items 1, 2, and 3, and the probabilities are one-third for each of Virtual Items 1, 2, and 3, the price of a container instance of virtual container 204 may be calculated as [(190/3)+(170/3)+(180/3)] Gems=180 Gems. In this way, among other benefits, if Virtual Item 1 is the most valuable or desired virtual item of the three virtual items, virtual container 204 may be perceived by users as a chance to obtain an item instance of the most valuable or desired virtual item for less than the typical price point of purchasing an item instance of that most valuable or desired virtual item (e.g., a container instance of virtual container 204 is 180 Gems while the price to purchase an item instance of Virtual Item 1 is 190 Gems).

In another scenario, still referring to FIG. 2A, Virtual Item 1 may be the most valuable virtual item that can be obtained via activation of a container instance of virtual container 204. As such, the price of 180 Gems to purchase a container instance of virtual container 204 may be based on a calculated price determined for an item instance of Virtual Item 1. The calculated price determined for an item instance of Virtual Item 1 may be the price at which users most frequently purchase item instances of Virtual Item 1 during a certain time period (e.g., last two weeks, last month, overall, etc.). As an example, the most frequent price point for Virtual Item 1 may be 180 Gems, and a container instance of virtual container 204 may be sold for 180 Gems to reflect the most frequent price point for Virtual Item 1. As another example, the most frequent price point for Virtual Item 1 may be 190 Gems, and a container instance of virtual container 204 may be sold at 180 Gems to reflect a price for the container instance that is less than the most frequent price point for Virtual Item 1. The container price may, for instance, be a price that is a predetermined amount less than the most frequent price point (e.g., 5 Gems less, 5% less, etc.), a rounded down price of the most frequent price point (e.g., the price of the most frequent price point rounded down to the nearest 10, to the nearest 5, etc.), or other price that is less than the most frequently price point.

Template module 114 may be configured to manage container templates. The managed container templates may include a first container template or other container templates. In certain implementations, item manager module 110 may be configured to generate one or more container instances of the first virtual container based on the first container template. As discussed, in one use case, an administrator may manually enter inputs relating attributes of a given virtual container into an administrative user interface. The inputs may be saved as a container template among a plurality of container templates such that the container template may be selected at a later time to generate one or more container instances of the given virtual container.

In some implementations, individual ones of the container templates indicate: (i) an amount of virtual items in a virtual item set from which an item instance of a virtual item is provided to a user upon activation of a container instance of a virtual container; (ii) an item type of virtual items of the virtual item set; (iii) a probability that an item instance of a virtual item of the virtual item set will be provided to a user upon activation of a container instance the virtual container; or (iv) a value to be provided that is associated with at least one virtual item of the virtual item set responsive to a determination that an item instance of the at least one virtual item will be provided to a user that activated a container instance of the virtual container.

In one use case, with respect to FIG. 2A, a given container template from which container instances of virtual container 204 was generated may indicate: (i) an amount of virtual items as 3; (ii) at least one item type as "medium value" (e.g., from a choice of "low value," "medium value," "high value," or other types); (iii) at least one probability as one-third; and (iv) a relative value to be provided upon activation as 100% of the resulting container price of a container instance of a virtual container generated using the given container template. Setting the relative value to 100% may, for example, be performed to ensure that users will receive at least or close to a perceived value of a purchased container instance.

In another use case, Virtual Items 1, 2, and 3 may be "medium value" virtual items based on their respective retail/standard price or their respective perceived value by users. Prices of item instances of Virtual Items 1, 2, and 3 may respectively be 240 Gems, 200 Gems, and 100 Gems. Using the given container template, item manager module 110 may generate container instances of virtual container 204 by automatically selecting Virtual Items 1, 2, and 3 as the three virtual items for which an item instance may be provided to a user upon activation of a container instance of virtual container 204 based on the given container template indicating an amount of virtual items as 3 and an item type as "medium value." The container instances of virtual container 204 may be generated such that a container instance of virtual container 204 provides a user with a one-third probability for obtaining an item instance of any one of Virtual Items 1, 2, or 3 based on the given container template indicating a probability of one-third.

Based on the given container template indicating a relative value of 100% of the resulting container price (e.g., 180 Gems), the container instances of virtual container 204 may be generated such that a container instance of virtual container 204 provides a user with 2 item instances of Virtual Item 3 if, upon activation of the container instance, Virtual Item 3 is selected as the virtual item to provide to the user. Because a perceived value of an item instance of Virtual Item 3 may be 100 Gems, 2 item instances may be provided to the user to ensure that the user receives at least the perceived value of the purchased container instance of virtual container 204 upon activation (e.g., to ensure that the user receives at least 180 Gems worth of item instances upon activation).

Template module 114 may be configured such that the container templates are associated with template probabilities that individual ones of the container templates will be selected responsive to a stochastic selection of at least one of the container templates. The template probabilities may include a first template probability that the first container template will be selected responsive to a stochastic selection of at least one of the container templates. Item manager module 110 may be configured to generate one or more container instances of the first virtual container based on the first container template responsive to the first container being stochastically selected.

By way of example, item manager module 110 may stochastically select one of a plurality of stored container templates based on the template probabilities associated with each of the stored container templates when item manager module 110 is triggered to generate container instances of a virtual container. In one scenario, a virtual store in a game space may automatically provide container instances of new virtual containers on a periodic basis (e.g., bi-weekly, monthly, etc.). At the beginning of each new period, item manager module 110 may generate container instances of new virtual containers to provide the container instances for purchase at the virtual store.

In certain implementations, template module 114 may be configured to modify the template probabilities. Template module 114 may, for example, be configured to modify the template probabilities based on a determination that certain container templates have recently been used, that certain types of container templates (e.g., "low value," "medium value," "high value," or other types) have recently been used, that certain other container templates have not recently been used, that certain other types of container templates have not recently been used, etc. In one use case, for example, if a particular "high value" container template is selected by item manager module 110 during a stochastic selection to generate container instances of a new virtual container, template module 114 may automatically decrease the probability that the particular "high value" container template will be selected during a stochastic selection or decrease the selection probabilities for all "high value" container templates. In this way, container instances of a variety of virtual containers may be offered to users.

Server(s) 102, client computing platforms 104, external resources 116, and/or other components may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platforms 104, external resources 116, and/or other components may be operatively linked via some other communication media.

A given client computing platform 104 may include one or more processors configured to execute computer program modules. The computer program modules may be configured to enable an expert or user associated with client computing platform 104 to interface with system 100 and/or external resources 116, and/or provide other functionality attributed herein to client computing platforms 104. By way of non-limiting example, client computing platform 104 may include one or more of a desktop computer, a laptop computer, a handheld computer, a netbook, a smartphone, a gaming console, and/or other computing platforms.

External resources 116 may include sources of information, hosts and/or providers of virtual spaces outside of system 100, external entities participating with system 100, and/or other resources. In some implementations, some or all of the functionality attributed herein to external resources 116 may be provided by resources included in system 100.

In some implementations, server(s) 102 may include an electronic storage 118, one or more processor(s) 120, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 118 may comprise non-transitory storage media that electronically stores information. The electronic storage media of electronic storage 118 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 118 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 118 may include one or more virtual storage resources (e.g., cloud storage, a virtual private network, and/or other virtual storage resources). Electronic storage 118 may store software algorithms, information determined by processor(s) 120, information received from server(s) 102, information received from client computing platforms 104, and/or other information that enables server(s) 102 to function as described herein.

Processor(s) 120 is configured to provide information processing capabilities in server(s) 102. As such, processor(s) 120 may include one or more of a digital processor, an analog processor, a digital circuit designed to process information, an analog circuit designed to process information, a state machine, and/or other mechanisms for electronically processing information. Although processor(s) 120 is shown in FIG. 1 as a single entity, this is for illustrative purposes only. In some implementations, processor(s) 120 may include a plurality of processing units. These processing units may be physically located within the same device, or processor(s) 120 may represent processing functionality of a plurality of devices operating in coordination. Processor(s) 120 may be configured to execute modules 106, 108, 110, 112, 114, and/or other modules. Processor(s) 120 may be configured to execute modules 106, 108, 110, 112, 114, and/or other modules by software; hardware; firmware; some combination of software, hardware, and/or firmware; and/or other mechanisms for configuring processing capabilities on processor(s) 120. As noted, in certain implementations, a given client computing platform 104 may include one or more computer program modules that is the same as or similar to the computer program modules of server(s) 102. Client computing platform 104 may include one or more processors that are the same or similar to processor(s) 120 of server(s) 102 to execute such computer program modules of client computing platform 104.

It should be appreciated that although modules 106, 108, 110, 112, and 114 are illustrated in FIG. 1 as being co-located within a single processing unit, in implementations in which processor(s) 120 includes multiple processing units, one or more of modules 106, 108, 110, 112, and/or 114 may be located remotely from the other modules. The description of the functionality provided by the different modules 106, 108, 110, 112, and/or 114 described below is for illustrative purposes, and is not intended to be limiting, as any of modules 106, 108, 110, 112, and/or 114 may provide more or less functionality than is described. For example, one or more of modules 106, 108, 110, 112, and/or 114 may be eliminated, and some or all of its functionality may be provided by other ones of modules 106, 108, 110, 112, and/or 114. As another example, processor(s) 120 may be configured to execute one or more additional modules that may perform some or all of the functionality attributed below to one of modules 106, 108, 110, 112, and/or 114.

Figure 3:
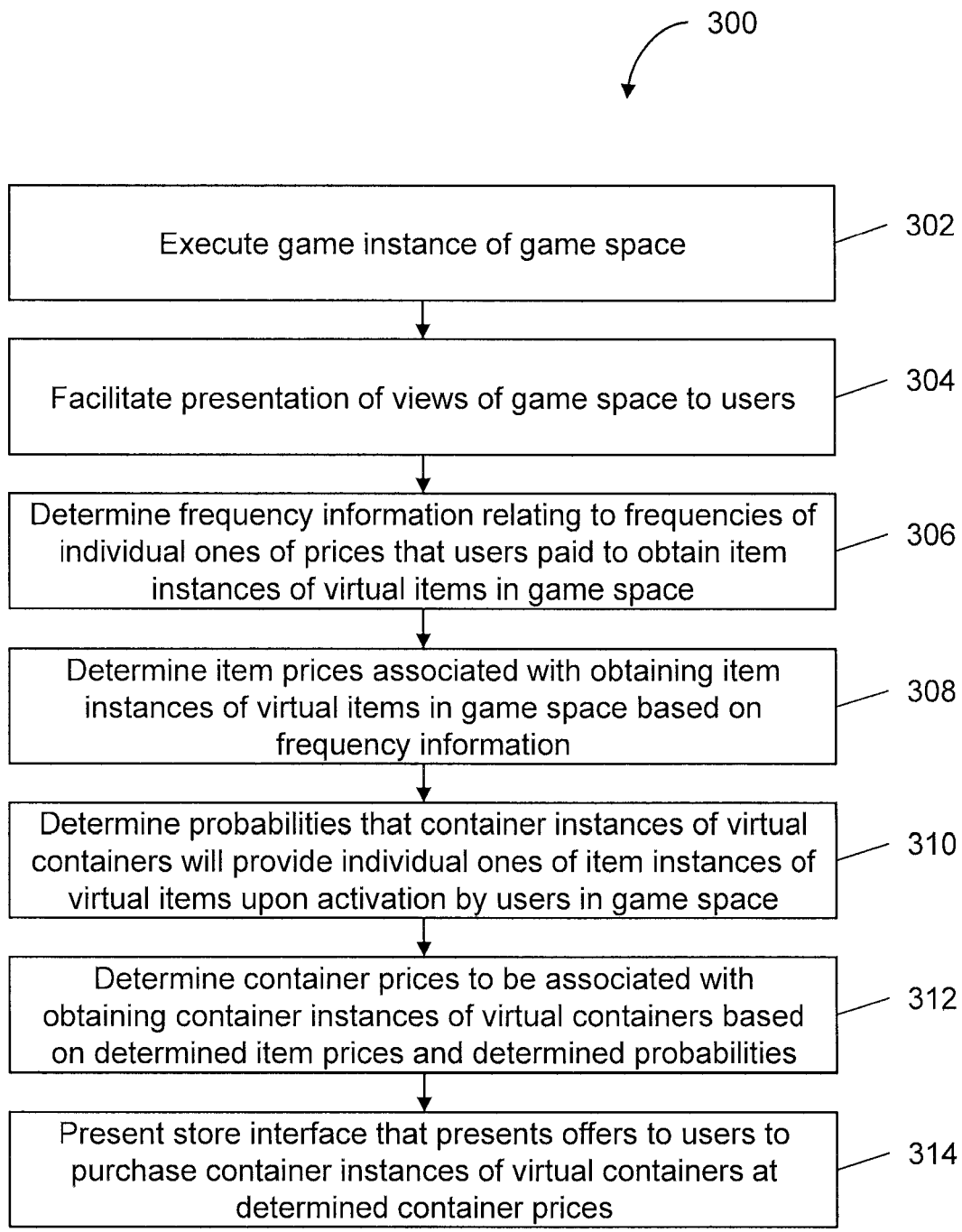
FIG. 3 illustrates a method of facilitating pricing of virtual containers, in accordance with one or more implementations.

FIG. 3 illustrates a method of facilitating pricing of virtual containers, in accordance with one or more implementations. The operations of method 300 presented below are intended to be illustrative. In some implementations, method 300 may be accomplished with one or more additional operations not described, and/or without one or more of the operations discussed. Additionally, the order in which the operations of method 300 are illustrated in FIG. 3 and described below is not intended to be limiting.

In some implementations, method 300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 300 in response to instructions stored electronically on an electronic storage medium. The one or more processing devices may include one or more devices configured through hardware, firmware, and/or software to be specifically designed for execution of one or more of the operations of method 300.

At an operation 302, a game instance of a game space may be executed. Operation 302 may be performed by a game module that is the same as or similar to game module 106, in accordance with one or more implementations.

At an operation 304, presentation of views of the game space to users may be facilitated. The game space may be configured to facilitate interaction of the users with the game space and/or each other by performing operations in the game space in response to commands received from the users. Operation 304 may be performed by a game module that is the same as or similar to game module 106, in accordance with one or more implementations.

At an operation 306, frequency information relating to frequencies of individual ones of prices that the users paid to obtain item instances of virtual items in the game space may be determined. For example, the virtual items may include a first virtual item, a second virtual item, or other virtual items. The frequency information may include information relating to frequencies of individual ones of prices that the users paid to obtain an item instance of the first virtual item, information relating to frequencies of individual ones of prices that the users paid to obtain an item instance of the second virtual item, or information relating to frequencies of individual ones of prices that the users paid to obtain item instances of the other virtual items. Operation 306 may be performed by a price module that is the same as or similar to price module 108, in accordance with one or more implementations.

At an operation 308, item prices associated with obtaining the item instances of the virtual items in the game space may be determined based on the frequency information. The item prices may include a first item price associated with obtaining an item instance of the first virtual item, a second item price associated with obtaining an item instance of the second virtual item, or other item prices associated with obtaining item instances of the other virtual items. Operation 308 may be performed by a price module that is the same as or similar to price module 108, in accordance with one or more implementations.

At an operation 310, probabilities that container instances of virtual containers will provide individual ones of the item instances of the virtual items upon activation by the users in the game space may be determined. For example, the virtual containers may include a first virtual container or other virtual containers. The probabilities may include a first probability that a container instance of the first virtual container will provide an item instance of the first virtual item upon activation, a second probability that a container instance of the first virtual container will provide an item instance of the second virtual item upon activation, or other probabilities that a container instance of the first virtual container will provide item instances of the other virtual items. Operation 310 may be performed by an item manager module that is the same as or similar to item manager module 110, in accordance with one or more implementations.

At an operation 312, container prices to be associated with obtaining the container instances of the virtual containers may be determined based on the determined item prices and the determined probabilities. For example, if item instances of the first virtual item and the second virtual item may be obtainable upon activation of a container instance of the first virtual container, a first container price for obtaining a container instance of the first virtual container may be determined based on the first item price (relating to the first virtual item), the first probability (relating to the first virtual item), the second item price (relating to the second virtual item), and the second probability (relating to the second virtual item). Operation 312 may be performed by a price module that is the same as or similar to price module 108, in accordance with one or more implementations.

At an operation 314, a store interface may be presented. The store interface may present offers to the users to purchase the container instances of the virtual containers at the determined container prices. For example, the store interface may present a container instance of the first virtual container for purchase at the first container price (that is determined for the first virtual container based on the first item price, the first probability, the second item price, and the second probability). Operation 314 may be performed by a store module that is the same as or similar to store module 112, in accordance with one or more implementations.

Figure 4:
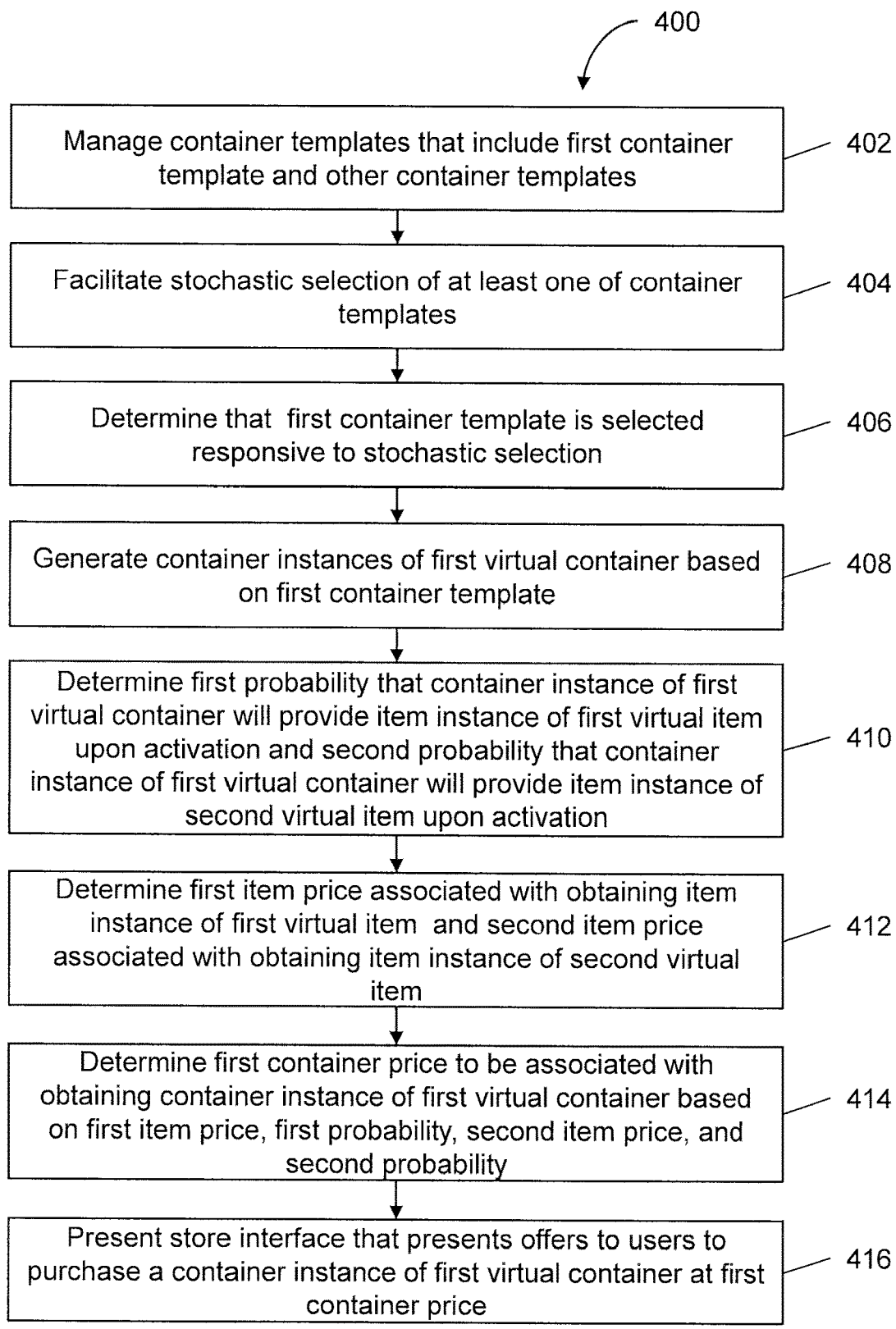
FIG. 4 illustrates a method of facilitating stochastic selection of container templates and pricing of template-based virtual containers, in accordance with one or more implementations.

FIG. 4 illustrates a method of facilitating stochastic selection of container templates and pricing of template-based virtual containers, in accordance with one or more implementations. The operations of method 400 presented below are intended to be illustrative. In some implementations, method 400 may be accomplished with one or more additional operations not described, and/or without one or more of the operations discussed. Additionally, the order in which the operations of method 400 are illustrated in FIG. 4 and described below is not intended to be limiting.

In some implementations, method 400 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 400 in response to instructions stored electronically on an electronic storage medium. The one or more processing devices may include one or more devices configured through hardware, firmware, and/or software to be specifically designed for execution of one or more of the operations of method 400.

At an operation 402, container templates that include a first container template and other container templates may be managed. By way of example, individual ones of the container templates may indicate: (i) an amount of virtual items in a virtual item set from which an item instance of a virtual item is provided to a user upon activation of a container instance of a virtual container; (ii) an item type of virtual items of the virtual item set; (iii) a probability that an item instance of a virtual item of the virtual item set will be provided to a user upon activation of a container instance the virtual container; or (iv) a value to be provided that is associated with at least one virtual item of the virtual item set responsive to a determination that an item instance of the at least one virtual item will be provided to a user that activated a container instance of the virtual container. Operation 402 may be performed by a template module that is the same as or similar to template module 114, in accordance with one or more implementations.

At an operation 404, stochastic selection of at least one of the container templates may be facilitated. Operation 404 may be performed by an item manager module that is the same as or similar to item manager module 110, in accordance with one or more implementations.

At an operation 406, selection of the first container template responsive to the stochastic selection may be determined. Operation 406 may be performed by an item manager module that is the same as or similar to item manager module 110, in accordance with one or more implementations.

At an operation 408, one or more container instances of a first virtual container may be generated based on the first container template. As indicated by FIG. 4, the one or more container instances of the first virtual container may be generated based on the first container template responsive to the determination that the first container template is selected during the stochastic selection. In some implementations, the one or more container instances of the first virtual container may be generated such that a container instance of the first virtual container is configured to be activated a plurality of times by a user to obtain a plurality of item instances of a first virtual item, a second virtual item, or other virtual items. Operation 408 may be performed by an item manager module that is the same as or similar to item manager module 110, in accordance with one or more implementations.

At an operation 410, a first probability that a container instance of the first virtual container will provide an item instance of a first virtual item upon activation (e.g., activation of the container instance of the first virtual container by a user) and a second probability that a container instance of the first virtual container will provide an item instance of a second virtual item upon activation (e.g., activation of the container instance of the first virtual container by a user) may be determined. Operation 410 may be performed by an item manager module that is the same as or similar to item manager module 110, in accordance with one or more implementations.

At an operation 412, a first item price associated with obtaining an item instance of the first virtual item and a second item price associated with obtaining an item instance of the second virtual item may be determined. In certain implementations, the first item price may be determined based on one or more prices that one or more users of a game space paid to obtain an item instance of the first virtual item. The second item price may be determined based on one or more prices that one or more users of a game space paid to obtain an item instance of the second virtual item. In some implementations, the first item price may be determined based on frequencies of individual ones of the prices that the users paid to obtain an item instance of the first virtual item. The second item price may be determined based on frequencies of individual ones of the prices that the users paid to obtain an item instance of the second virtual item. Operation 412 may be performed by a price module that is the same as or similar to price module 108, in accordance with one or more implementations.

At an operation 414, a first container price to be associated with obtaining a container instance of the first virtual container may be determined based on the first item price, the first probability, the second item price, and the second probability. Operation 414 may be performed by a price module that is the same as or similar to price module 108, in accordance with one or more implementations.

In some implementations, the first container price may be determined based on the first item price, the first probability, the second item price, or the second probability. As an example, the first container price may be determined based on the first item price and the first probability. As another example, the first container price may be determined based on the second item price and the second probability. As indicated, determination of the first container price may be performed by a price module that is the same or similar to price module 108, in accordance with one or more implementations.

At an operation 416, a store interface may be presented such that the store interface presents offers to users to purchase a container instance of the first virtual container at the first container price. Operation 416 may be performed by a store module that is the same as or similar to store module 112, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system for providing virtual containers in a game that, upon activation, provide one virtual item determined stochastically from a set of virtual items, the system comprising:
one or more processors configured by machine-readable instructions to:
execute a game instance of the game, and to facilitate presentation of views of the game to users on client computing platforms, wherein the users are associated with the client computing platforms, wherein the game facilitates interaction of the users with the game and/or each other such that interaction of a first user with the game is facilitated;
determine, by the one or more processors, item prices associated with previous purchases of item instances of the virtual items in the game, wherein the virtual items include a first virtual item and a second virtual item, wherein the item prices are determined based on individual prices that the users have previously paid for the item instances of the virtual items, wherein the item prices include a first item price for the item instances of the first virtual item and a second item price for the item instances of the second virtual item;

determine, by the one or more processors, probabilities that container instances of virtual containers will provide individual ones of item instances of the virtual items upon activation by the users in the game, wherein the virtual containers include a first virtual container, and the probabilities include a first probability that a container instance of the first virtual container will provide an item instance of the first virtual item upon activation and a second probability that the container instance of the first virtual container will provide an item instance of the second virtual item upon activation;

determine, by the one or more processors, container prices that are associated with purchase of the container instances of the virtual containers based on the determined item prices and the determined probabilities such that a first container price for purchase of the container instance of the first virtual container is determined based on the first item price, the first probability, the second item price, and the second probability, and further such that the first container price ranges between the first item price and the second item price, inclusively;

present, by the one or more processors, a store interface to the users through display on the client computing platforms, wherein the store interface presents offers to the users to purchase the container instances of the virtual containers at the determined container prices such that the container instance of the first virtual container is presented through the store interface for purchase at the first container price and further such that the users are notified that the item instance of either the first virtual item or the item instance of the second virtual item will be provided by the container instance upon activation subsequent to purchase, wherein the store interface is presented to the first user through display on the first client computing platform;

update, by the one or more processors, subsequent to a first user purchasing the container instance of the first virtual container at the first container price, a user inventory associated with the first user to include the container instance of the first virtual container;

receive, by the one or more processors, a command from the first client computing platform activating the container instance included in the user inventory;

make a determination based on one or more of the first probability and the second probability, by the one or more processors, subsequent to activating the container instance by the first user, whether to provide to the first user (i) the item instance of the first virtual item, or
(ii) the item instance of the second virtual item; and
providing to the first user, by adding to the user inventory, based on the determination, one of (i) the item instance of the first virtual item, or
(ii) the item instance of the second virtual item.

2. The system of claim 1, wherein the one or more processors are configured by machine-readable instructions to facilitate the presentation of the views of the game by transmission of view information to the client computing platforms via a network.

3. The system of claim 2, wherein the interactions are facilitated by performing operations in the game in response to commands received via the network from the client computing platforms.

4. The system of claim 1, wherein the one or more processors are further configured by machine-readable instructions to:

determine frequency information relating to frequencies of individual prices that the users have paid to purchase the item instances of the virtual items in the game, wherein the frequencies include first frequencies related to previous purchases of the item instances of the first virtual item and second frequencies related to previous purchases of the item instances of the second virtual item, wherein determining the first item price is further based on the first frequencies, and wherein determining the second item price is further based on the second frequencies.

5. The system of claim 1, wherein the one or more processors are configured by machine-readable instructions to manage the virtual containers such that the container instance of the first virtual container is configured to be activated a plurality of times by the first user, wherein subsequently to the first virtual container being activated the plurality of times, the first user will be provided with a corresponding plurality of item instances of the first virtual item or the second virtual item.

6. The system of claim 1, wherein the one or more processors are configured by machine-readable instructions to manage container templates that include a first container template, and to generate one or more container instances of the first virtual container based on the first container template.

7. The system of claim 6, wherein individual ones of the container templates indicate:

(i) an amount of virtual items in a virtual item set from which an item instance of a virtual item is provided to a user upon activation by the user of a container instance of a virtual container;
(ii) an item type of virtual items of the virtual item set; or
(iii) a probability that the item instance of the virtual item of the virtual item set is provided to the user upon activation by the user of the container instance of the virtual container.

8. The system of claim 6, wherein the one or more processors are configured by machine-readable instructions such that the container templates are associated with template probabilities that individual ones of the container templates will be selected responsive to a stochastic selection of at least one of the container templates, wherein the template probabilities include a first template probability that the first container template will be selected responsive to a stochastic selection of at least one of the container templates, and wherein the one or more processors are configured by machine-readable instructions to generate one or more container instances of the first virtual container based on the first container template responsive to the first container template being stochastically selected.

9. A computer-implemented method of providing virtual containers in a game that, upon activation, provide one virtual item determined stochastically from a set of virtual items, the method being implemented on a computer system that includes one or more physical processors, the method comprising:

executing, by the one or more physical processors, a game instance of the game;
facilitating, by the one or more physical processors, presentation of views of the game to users, wherein the users are associated with the client computing platforms, wherein the game facilitates interaction of the users with the game and/or each other such that interaction of a first user with the game is facilitated;

determining, by the one or more physical processors, item prices associated with previous purchases of item instances of the virtual items in the game, wherein the virtual items include a first virtual item and a second virtual item, wherein the item prices are determined based on individual prices that the users have previously paid for the item instances of the virtual items, wherein the item prices include a first item price for the item instances of the first virtual item and a second item price for the item instances of the second virtual item;

determining, by the one or more physical processors, probabilities that container instances of virtual containers will provide individual ones of the item instances of the virtual items upon activation by the users in the game, wherein the virtual containers include a first virtual container, and the probabilities include a first probability that a container instance of the first virtual container will provide an item instance of the first virtual item upon activation and a second probability that the container instance of the first virtual container will provide an item instance of the second virtual item upon activation;

determining, by the one or more physical processors, container prices that are associated with purchase of the container instances of the virtual containers based on the determined item prices and the determined probabilities such that a first container price for purchase of the container instance of the first virtual container is determined based on the first item price, the first probability, the second item price, and the second probability, and further such that the first container price ranges between the first item price and the second item price, inclusively;

presenting, by the one or more physical processors, a store interface to the users through display on the client computing platforms, wherein the store interface presents offers to the users to purchase the container instances of the virtual containers at the determined container prices such that the container instance of the first virtual container is presented for purchase at the first container price and further such that the users are notified that the item instance of either the first virtual item or the item instance of the second virtual item will be provided by the container instance upon activation subsequent to purchase, wherein the store interface is presented to the first user through display on the first client computing platform;

updating, by the one or more physical processors, subsequent to a first user purchasing the container instance of the first virtual container at the first container price, a user inventory associated with the first user to include the container instance of the first virtual container;

receiving, by the one or more physical processors, a command from the first client computing platform activating the container instance included in the user inventory;

making a determination based on one or more of the first probability and the second probability, by the one or more physical processors, subsequent to activating the container instance by the first user, whether to provide to the first user (i) the item instance of the first virtual item, or (ii) the item instance of the second virtual item; and providing to the first user, by adding to the user inventory, based on the determination, one of (i) the item instance of the first virtual item, or (ii) the item instance of the second virtual item.

10. The method of claim 9, wherein the presentation of the views of the game is facilitated by transmission of view information to the client computing platforms via a network.

11. The method of claim 10, wherein the interactions are facilitated by performing operations in the game in response to commands received via the network from the client computing platforms.

12. The method of claim 9, further comprising:

determining, by the one or more processors, frequency information relating to frequencies of individual prices that the users have paid to purchase item instances of virtual items in the game, wherein the frequencies include first frequencies related to previous purchases of the item instances of the first virtual item and second frequencies related to previous purchases of the item instances of the second virtual item, wherein determining the first item price is further based on the first frequencies, and wherein determining the second item price is further based on the second frequencies.

13. The method of claim 9, further comprising managing, by the one or more physical processors, the virtual containers such that the container instance of the first virtual container is configured to be activated a plurality of times by the first user, wherein subsequently to the first virtual container being activated the plurality of times, the first user will be provided with a corresponding plurality of item instances of the first virtual item or the second virtual item.

14. The method of claim 9, further comprising:

managing, by the one or more physical processors, container templates that include a first container template;

generating, by the one or more physical processors, the container instance of the first virtual container based on the first container template.

15. The method of claim 14, wherein individual ones of the container templates indicate:

(i) an amount of virtual items in a virtual item set from which an item instance of a virtual item is provided to a user upon activation by the user of a container instance of a virtual container;

(ii) an item type of virtual items of the virtual item set; or (iii) a probability that the item instance of the virtual item of the virtual item set is provided to the user upon activation by the user of the container instance of the virtual container.

16. The method of claim 14, wherein the container templates are associated with template probabilities that individual ones of the container templates will be selected responsive to a stochastic selection of at least one of the container templates, and wherein the template probabilities include a first template probability that the first container template will be selected responsive to a stochastic selection of at least one of the container templates, the method further comprising:

generating, by the one or more physical processors, one or more container instances of the first virtual container based on the first container template responsive to the first container template being stochastically selected.

* * * * *